United States Patent [19]

Tanaka et al.

[11] Patent Number: 5,105,060
[45] Date of Patent: Apr. 14, 1992

[54] AUTOMATIC FEED SYSTEM FOR PARTS TO BE WELDED

[75] Inventors: Tetsunori Tanaka; Shizuo Sagara, both of Toyota; Nobuji Koda, Kasugai; Takehito Tanabe, Ichinomiya, all of Japan

[73] Assignee: Yajima Kogyo, Inc., Nagoya, Japan

[21] Appl. No.: 623,872

[22] Filed: Dec. 7, 1990

[30] Foreign Application Priority Data

Dec. 19, 1989 [JP] Japan .................... 1-145502[U]

[51] Int. Cl.$^5$ .................... B23K 11/31; B23K 11/14
[52] U.S. Cl. .................... 219/95; 219/78.01
[58] Field of Search ............... 219/95, 93, 98, 99, 219/78.01, 117.1

[56] References Cited

U.S. PATENT DOCUMENTS

| | | | |
|---|---|---|---|
| 3,146,334 | 8/1964 | Kinser et al. | 219/95 |
| 3,377,458 | 4/1968 | Keusch | 219/95 |
| 4,215,262 | 7/1980 | Brastow | 219/95 |
| 4,754,116 | 6/1988 | Naruse | 219/78.01 |
| 4,789,768 | 12/1988 | Tobita et al. | 219/78.01 |

Primary Examiner—Geoffrey S. Evans
Attorney, Agent, or Firm—Armstrong, Nikaido, Marmelstein, Kubovcik & Murray

[57] ABSTRACT

This feed system comprises: feed device for feeding a part to be welded, which can be inserted into a hole of a work, to the vicinity of an electrode of a welder; chuck for removably chucking the part fed by the feed means; first transfer device for transferring the trailing end of the feed device to and from the chuck; a guide pin held capable of being transferred by the electrode for being inserted into the work when the work is to be positioned; second transfer device connected to the chuck for positioning the part, which is chucked by the chuck, concentrically of the guide pin of the electrode; and pusher transferred by the second transfer device for pushing the part, which is chucked concentrically of the guide pin by the chuck, to insert the part into the hole of the work.

7 Claims, 4 Drawing Sheets

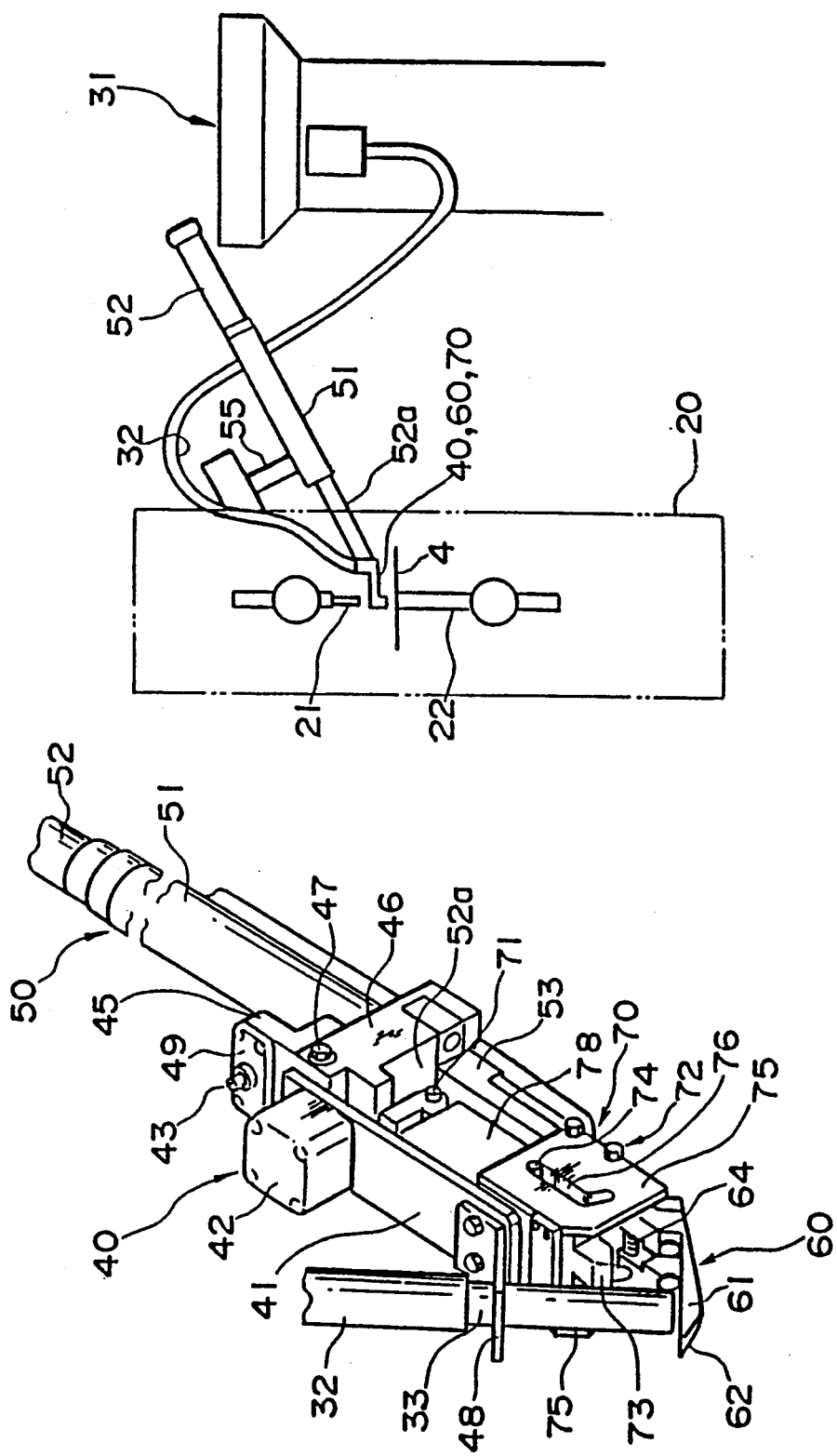

Fig. 3(c)
Fig. 3(d)
Fig. 3(e)
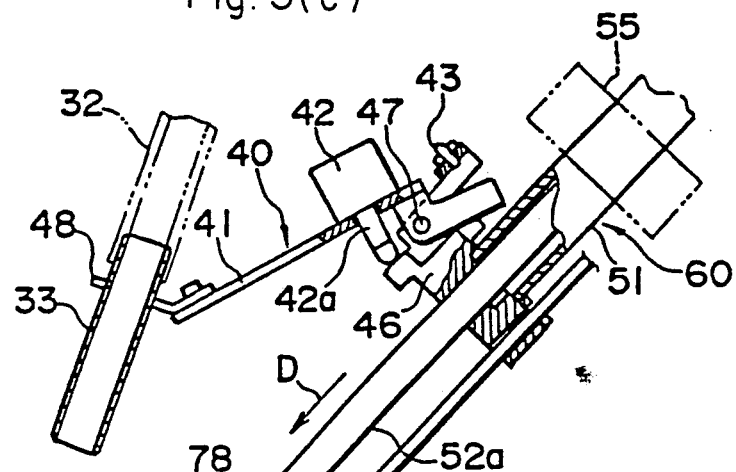
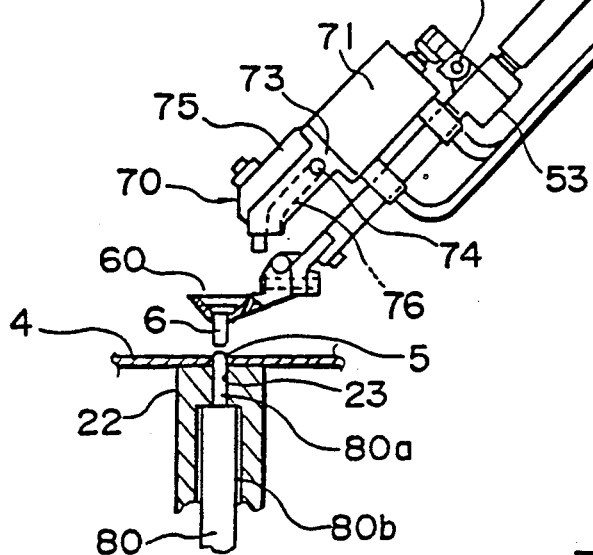
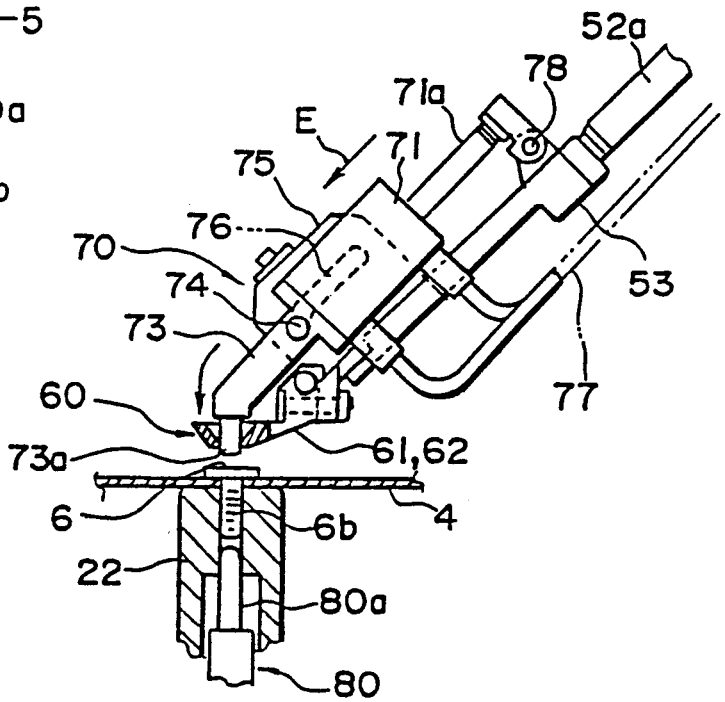
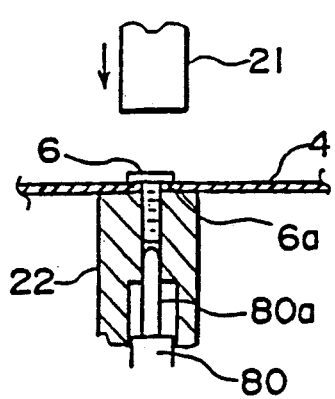

AUTOMATIC FEED SYSTEM FOR PARTS TO BE WELDED

BACKGROUND OF THE INVENTION

1. Field of the Invention

The present invention relates to an automatic feed system for a part to be resistance-welded and, more particularly, to an automatic feed system to be used when a T-shaped part such as a bolt is projection-welded to a work.

2. Description of the Prior Art

The projection welding of the bolt to the work is generally accomplished according to the following procedures First of all, the work (e.g., a steel sheet) is positioned with respect to the lower electrode of a resistance welder. This positioning is performed by aligning a welding preliminary hole formed in the work with a relief hole formed in the central portion of the lower electrode. When this positioning is ended, the bolt has its stem inserted into the welding hole of the work. Then, the bolt has its head pushed onto the work by the upper electrode of the welder coming down. In this state, a welding current is supplied between the upper and lower electrodes to effect the projection welding between the bolt and the work.

The projection welding thus far described is a manual one, but there is known a technology for feeding the bolt automatically to the welding preliminary hole of the work (as disclosed in Japanese Patent Publication No. 60-54832).

FIG. 9 shows a bolt feed system disclosed in the above-identified Publication. In this system, a guide pin 2 is axially movably fitted in the lower electrode 1 of a welder. The guide pin 2 is urged upwardly by a spring 3. The guide pin 2 can be inserted in a (welding preliminary) hole 5 of a work 4 so that the work 5 is positioned with respect to the lower electrode 1. The bolt 6 to be welded is fed by a not-shown chute until it is chucked at the terminal end of the chute by chucking means 7.

The chucked bolt 6 is transferred to above an electrode push line, on which it is pushed by the upper electrode 8. In this case, the chuck 7 has its fingers 7a opened by the pushing action of the upper electrode 8 to push the bolt 6 downward. As a result, the bolt 6 is moved away from the chuck 7 to have its stem 6b inserted into the welding hole 5 of the work 4 and further into the lower electrode 1. When the upper electrode 8 is moved downward, the bolt 6 has its head projections 6a pushed onto the work 4. In this state, the welding current is supplied between the upper electrode 8 and the lower electrode 1 so that the bolt 6 is projection-welded at its projections 6a to the work 4.

In the system of the aforementioned system, however, the fingers 7a of the chuck 7 and the upper electrode slide into contact with each other each time the bolt 6 is pushed, so that the upper electrode 8 has its leading end seriously worn. As a result, the surface of the electrode for pushing the bolt has its flatness lost to raise a problem that the bolt is obliquely pushed. In order to avoid this problem, however, it is necessary to repair or replace the electrode frequently.

In this system, moreover, the chuck for chucking the bolt is influenced at each welding operation by the excess pressure of the electrode and the welding heat so that the durability of the chuck is dropped to make the chucking of the bolt instable. As a result, an mistaken insertion of the bolt is liable to occur and is difficult to detect. This raises another problem that stable welding qualities cannot be ensured.

SUMMARY OF THE INVENTION

In view of the above-specified problems, therefore, the present invention has an object to provide an automatic part feed system which can eliminate the wear of the electrode due to the chuck and the chucking failure of the part due to the electrode pressure and the welding heat.

In order to achieve the above-specified object, according to the present invention, there is provided an automatic feed system for a part to be welded, comprising: feed means for feeding a part to be welded, which can be inserted into a hole of a work, to the vicinity of an electrode of a welder; chuck means for removably chucking the part fed by feed means; first transfer means for transferring the trailing end of said feed means to and from said chuck means; a guide pin held capable of being transferred by said electrode for being inserted into said work when said work is to be positioned; second transfer means connected to said chuck means for positioning the part, which is chucked by said chuck means, concentrically of the guide pin of said electrode; and push means transferred by said second transfer means for pushing the part, which is chucked concentrically of said guide pin by said chuck means, to insert said part into the hole of said work.

In the automatic part feed system thus constructed, the part fed by the feed means is chucked by the chuck. When the part is chucked, the feed means has its trailing end moved apart from the chuck means by the first transfer means. When the tailing end of the feed means is moved apart from the chuck means, the part chucked by the chuck means is positioned concentrically of the guide by the second transfer means. Then, the positioned part is released from the chuck means and inserted into the hole of the work by the pushing force of the push means.

Thus, in the present invention, the push of the part is performed by not the electrode but the push means. As a result, no sliding contact is established between the electrode and the chuck means so that the electrode can have its lifetime elongated far more than that of the system of the prior art.

Since, moreover, the chuck means can be transferred by the second transfer means, the chuck means can be brought in the welding operation apart from the electrode so that it can be protected from the electrode pressure and the welding heat. As a result, it is possible to improve the durability and reliability of the chuck means and eliminate the chucking failures of the part.

BRIEF DESCRIPTION OF THE DRAWINGS

The aforementioned objects and features of the present invention will become apparent from the following description to be made with reference to the accompanying drawings, in which:

FIG. 1 is a perspective view showing an essential portion of the automatic part feed system according to one embodiment of the present invention;

FIG. 2 is a front elevation showing the whole structure of the system of FIG. 1;

FIGS. 3(a) to 3(e) are side elevations showing the individual steps of the projection welding by the system of FIG. 1;

DESCRIPTION OF THE PREFERRED EMBODIMENT

Figure 3A:
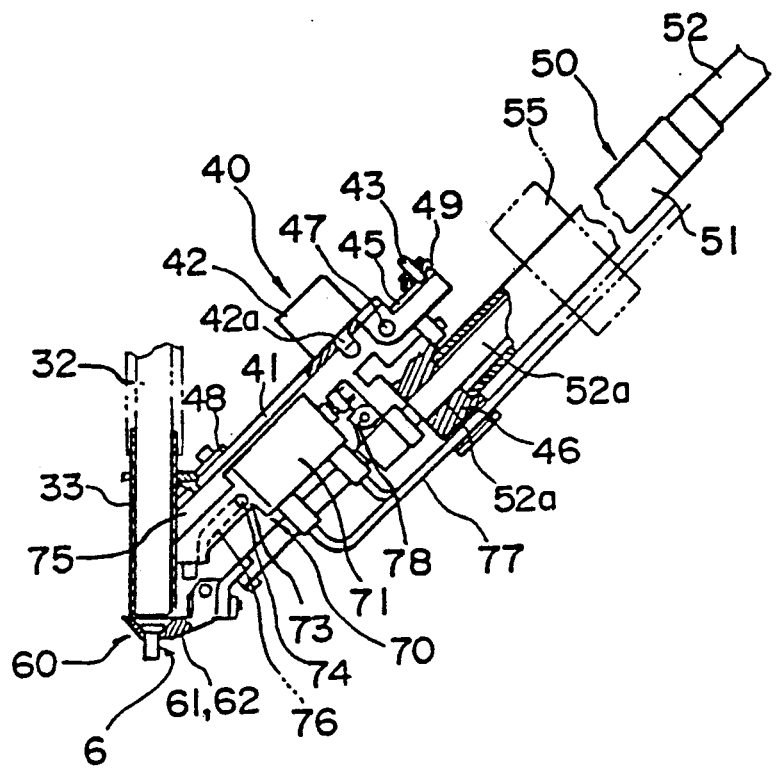

A desirable embodiment of the automatic part feed system according to the present invention will be described in the following with reference to the accompanying drawings.

FIGS. 1 to 8 show one embodiment of the present invention. The work and the bolt to be welded, as exemplified in the present embodiment, are similar to those shown in FIG. 9, and are designated at the identical reference numerals while their descriptions being omitted. Numeral 20 appearing in those Figures designate a resistance welder for the projection welding. This resistance welder 20 is equipped with an upper electrode 21 and a lower electrode 22. In the vicinity of the resistance welder 20, there is arranged a part feeder 31 which acts as feed means for feeding a T-shaped part to be welded, e.g., the bolt 6 to the vicinity of the two electrodes. The part feeder 31 has its feed hose 32 attached at its trailing end to a feed pipe 33. This feed pipe 33 is connected to first transfer means 40.

This first transfer means 40 includes a feed pipe lever 41, an escape cylinder 42, an adjusting screw 43, a support member 45, a head block 46, a pin 47 and so on. The feed pipe lever 41 supports the feed pipe 32 at its leading end through a support plate 48. The head block 46 is attached to the stationary side of later-described second transfer means 50. The feed pipe lever 41 is hinged to the head block 46 through the pin 47. To the feed pipe lever 41, there is attached the escape cylinder 42 which has its rod 42a abutting against the upper surface of the head block 46. The trailing end of the feed pipe lever 41 can abut against the adjusting screw 43 which is screwed in an adjusting plate 49 fixed on the head block 46. The feed piper lever 41 is rocked around the pin 47 by the action of the escape cylinder 42, and the adjusting screw 43 has a function to position the feed pipe lever 41 in the counter-clockwise direction. The adjusting screw 43 is used to align the axis A of the feed pipe 22 for extruding the bolt 6 to be welded and the axis B of a split hole which is defined by the fingers 61 and 62 of the later-described chuck means 50.

The second transfer means 50 includes a head pipe 51, a head cylinder 52 and an insertion base 53. The head pipe 51 has its leading end attached to the head block 46 of the aforementioned first transfer means 40. To the trailing end of the head pipe 51, there is attached the head cylinder 52 which has its rod 52a inserted into the head pipe 51 to have its leading end projecting out of the head pip 51. The rod 52a has its circumferential portion cut off in the axial direction so that its rotations are regulated by its sliding contact with the head block 46. The insertion base 53 is attached to the leading end of the rod 52a. The head cylinder 52 is connected with an air supply source through a not-shown electromagnetic valve.

The rod 52a acting as the second transfer means 50 is extended, when the word 4 is positioned with respect to the lower electrode 22 so that a welding start signal is issued. Incidentally, the head pipe 51 of the second transfer means 50 is fixed on the resistance welder 20 through a holding member 55.

Figure 4:
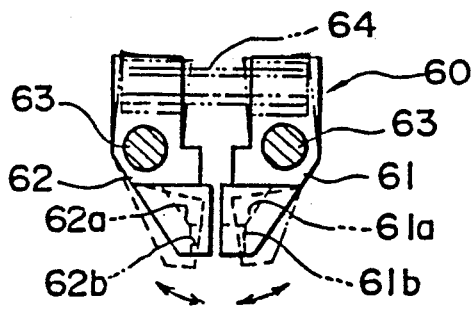
FIG. 4 is an enlarged front elevation showing the chuck means of the system of FIG. 1.
Figure 5:
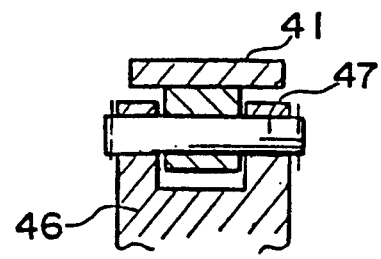
FIG. 5 is an enlarged section showing a portion of the first transfer means of the system of FIG. 1.

To the leading end of the insertion base 53 of the second transfer means 50, there is attached chuck means 60. This chuck means 60 is composed of the fingers 61 and 62, a pair of pins 63, and a compression coil spring 64, as shown in FIG. 4. The individual pins 63 are attached in parallel to the end of the insertion base 53. The finger 61 is hinged to one of the pins 63, and the finger 62 is hinged to the other pin 63. These fingers 61 and 62 are arranged to face each other. The fingers 61 and 62 are individually formed with inverted conical chucking faces 61a and 62a and split holes 61b and 62b for relieving the stem of the bolt 6. Between the fingers 61 and 62, there is interposed a compression coil spring 64 having an urging force, by which the fingers 61 and 62 are ordinarily closed to chuck the bolt 6. Thus, the chuck means 60 is ordinarily adapted to support the bolt 6 elastically. In case, however, the bolt 6 is pushed by later-described push means 70, the fingers 61 and 62 are opened by the abutments of their chucking faces 61a and 62a against the head of the bolt 6 so that the bolt 6 is allowed to be pushed out of the fingers 61 and 62.

In the state wherein the rod 52a of the second transfer means 50 is extended, the bolt 6 chucked by the fingers 61 and 62 has its axis aligned with that of a later-described guide pin 80.

Figure 6:
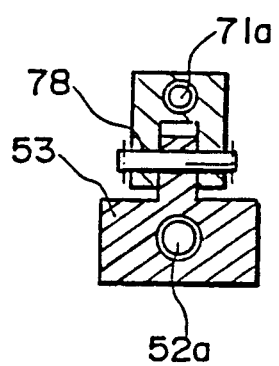
FIG. 6 is an enlarged section showing a portion of the push means of the system of FIG. 1.

To the insertion base 53 of the second transfer means 50, there is attached the push means 70. This push means 70 is composed of a pin joint 78, an insertion cylinder 71 and a guide mechanism 72. The insertion cylinder 71 has its rod 71a connected to the insertion base 53 through the pin joint 78 as shown in FIG. 6, so that it can swing up and down with respect to the insertion base 53. The guide mechanism 72 is composed of a push block 73, a guide pin 74 and a pair of guide plates 75. The push block 73 has its leading end 73a shaped to advance into the inside of the fingers 61 and 62 of the chuck means and its end face flattened to push the bolt 6. The guide plates 75 are formed with guide holes 76.

Figure 7:
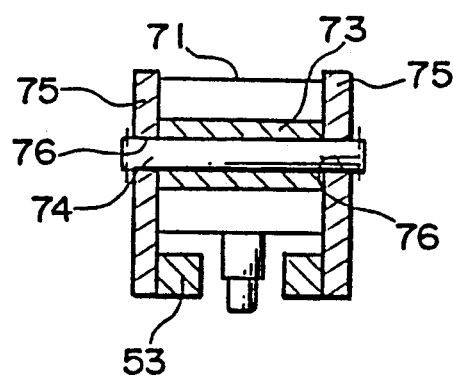
FIG. 7 is an enlarged section showing the guide mechanism of the push means of the system of FIG. 1.
Figure 8:
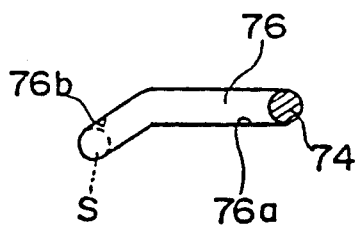
FIG. 8 is an enlarged front elevation of the guide hole of the guide mechanism of FIG. 7.
Figure 9:
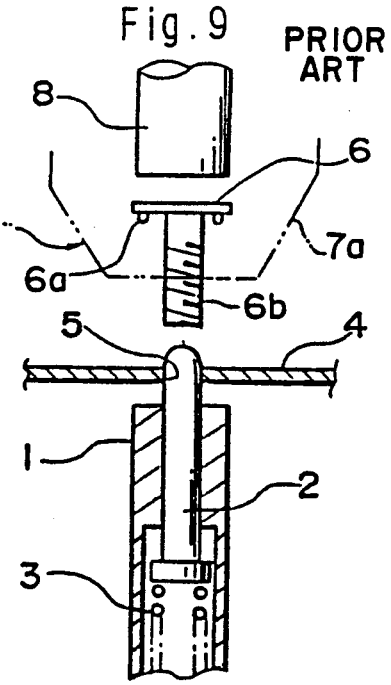
FIG. 9 is a section showing an essential portion of the automatic part feed system of the prior art.

These guide holes 76 are formed into a bent shape, as shown in FIG. 8. One 76a of the guide holes 76 is extended in parallel with the rod 52a of the second transfer means 50, and the other guide hole 76b is extended in parallel with the axis of the two electrodes 21 and 22. In the push block 73, there is fixed the guide pin 74 which has its two ends projecting from the two end faces of the push block 73, as shown in FIG. 7. The two ends of the guide pin 74 are inserted into the guide holes 76 of the guide plates 75. When the rod 71a of the insertion cylinder 71 is extended, the push block 73 is moved along the guide holes 76 of the guide plates 75 to push the head of the bolt 6, which is chucked by the chuck means 60, by its leading end. Incidentally, the insertion cylinder 71 has its air piping 77 connected with the air supply source through a not-shown electromagnetic valve.

The lower electrode 22 is formed therein with an axially-extending holding hole 23. In this holding hole 23, there is fitted the guide pin 80 which is inserted into the hole (or the welding preliminary hole) 5 formed in the work (or the steel sheet) 4, to position the work 4 with respect to the lower electrode 22. The guide pin 80 has its leading end radially reduced to form a smaller-diameter portion 80a and its other end radially enlarged to form a larger-diameter portion 80b. The smaller-diameter portion 80a is one to be inserted into the hole 5 of the work 4 and has its end face rounded into a spherical shape. The guide pine 80 can be moved up and down by not-shown transfer means. The guide pin 80 comes into the lower electrode 22, when the bolt 6 is to be welded, and projects to a predetermined height from the top of the lower electrode 22 when in other operations. When the work is to be positioned, the guide pin 80 is inserted into the hole 5 of the work 4 to block the horizontal movements of the work 4 with respect to the lower electrode 22. These entrance and exit of the guide pin 80 are detected by a not-shown sensor.

Incidentally, the present embodiment is exemplified by using the bolt as the part to be welded, which should not be limited to the bolt if it has a T-shaped section and can be chucked by the chuck means 60.

Moreover, the present invention is exemplified by directing the axis of the two electrodes vertically, but the present invention can be applied to the direction in which the axis of the two electrodes are horizontal.

Next, the operations of the automatic part feed system thus constructed will be described in the following.

First of all, the bolt 6 arrayed in the predetermined direction by the part feeder 31 is discharged through the feed hose 32 from the feed pipe 33. The bolt 6 thus discharged is received by the fingers 61 and 62 of the chuck means 60, as shown in FIG. 3(a). Since, in this state, the two fingers 61 and 62 are urged to be closed by the compression spring 64, the bolt 6 is freed from dropping from the chuck means 60. In this state, moreover, the bolt 6 has its stem 6b fitted in the split hole 61b and 62b having a slightly larger diameter and its head abutting against the inverted-conical chucking faces 61a and 62a. As a result, the bolt 6 is centered and held horizontal by the split holes and the chucking faces so that it is chucked in the upright position by the chuck means 60.

Figure 3B:
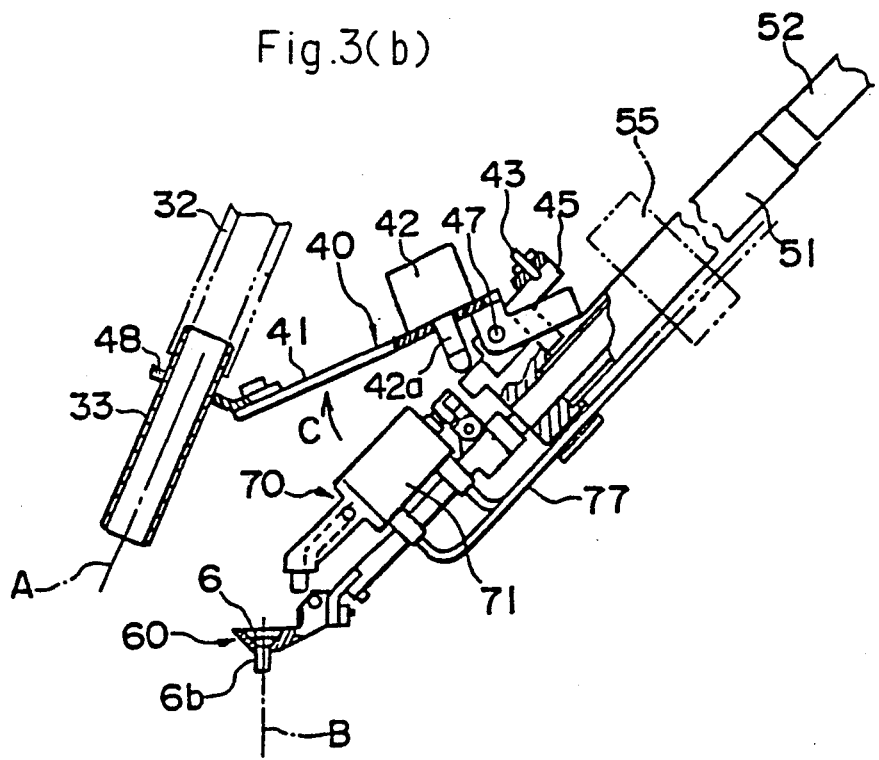

When the bolt 6 is thus chucked by the chuck means 60, as shown in FIG 3(b), the feed pipe 33 for discharging the bolt 6 is moved apart from the chuck means 60 by the first transfer means 40. Specifically, the rod 52a is extended by changing the compression air to the escape cylinder 42 so that the rod 42a and the head block 46 come into abutment. As a result, the feed pipe lever 41 for holding the feed pipe 33 is rocked in the direction of arrow C so that the feed pipe 33 has its lower end moved to above the chuck means 60.

When the feed pipe 33 relieves above, as shown in FIG. 3(c), the bolt 6 chucked by the chuck means 60 is moved toward the lower electrode 22 (i.e., in the direction of arrow D) by the extension of the rod 52a of the second transfer means 50, to have its axis aligned with that of the guide pin 80. In this state, moreover, the work 46 is conveyed by not-shown conveyor means and positioned by the guide pin 80.

When the positions of the bolt 6 and the guide pin 80 are aligned, as shown in FIG. 3(d), the push means 70 has its rod 71a extended in the direction of arrow E so that the push block 73 is moved along the guide holes 76 of the guide plates 75. Since the other guide hole 76 is extended along the axis of the upper and lower electrodes 21 and 22, the bolt 6 chucked by the chuck means 60 is pushed directly by the push block 73 positioned just above. When the bolt 6 is pushed by the push block 73, the inverted-conical chucking faces 61a and 62a of the fingers 61 and 62 are pushed by the head of the bolt 6. As a result, the fingers 61 and 62 are opened to push the bolt 6 downward. Since, in this state, the guide pin 80 for positioning the work 4 is fitted in the lower electrode 22, the stem 6b of the bolt 6 is inserted into the hole 5 of the work 4 and the hole 23 of the lower electrode 22.

Thus, in the present embodiment, the bolt 6 is released from the chuck means 60 by not the upper electrode 21 but the push block 73. As a result, the interference between the upper electrode and the chuck portion for chucking the bolt is eliminated unlike the prior art to cause not wear in the upper electrode 21. As a result, the upper electrode 21 has its lifetime improved far longer than that of the system of the prior art so that its replacement frequency can be reduced wile facilitating its maintenance.

When the bolt 6 is inserted into the hole 5 of the work 4, there arises the insertion failure in which the stem of the bolt 6 fails to enter the work 5 of the work or the holding hole 23 of the lower electrode 22. In this case, the guide pin 74 of the push means 70 fails to reach the point S of the guide hole 76. Thus, the welding failures can be prevented in advance by detecting those abnormal motions in terms of the stroke of the insertion cylinder 71 or the time difference from the predetermined operation time.

When the insertion of the bolt 6 into the work is ended, the rod 71a of the push means 70 and the rod 52a of the second transfer means 50 are contracted to return the chuck means 60 to the position shown in FIG. 3(b). Incidentally, the chuck means 60 has its individual fingers 61 and 62 closed again by the urging force of the compression coil spring 64 after the bolt 6 has been pushed. Moreover, the feed pipe 33 at the side of the part feeder 31 is returned again to the initial position, as shown in FIG. 3(a), by the contraction of the rod 42a of the first transfer means 40 so that the bolt 6 can be fed to the chuck means 60.

When the retraction of the chuck means 60 is ended, the weld indicating signal is outputted to the resistance welder 20 so that the upper electrode 21 it moved down to bring the projections 6a of the head of the bolt 6 into contact with the word 4, as shown in FIG. 3(e). In this state, the welding current is supplied between the upper electrode 21 and the lower electrode 22 so that the projection welding is accomplished by heating and melting the projections 6a concentratedly. Since, in this case, the chuck means 60 is apart from the upper and lower electrodes 21 and 22, it is kept away from the influences of the pressure and the welding heat of the upper and lower electrodes 21 and 22. As a result, the compression coil spring 64 is freed from any thermal deterioration, and the durability and reliability of the chuck means 60 are enhanced to eliminate the mistaken insertion of the bolt 6.

Incidentally, the push block 73 and the fingers 61 and 62 come into sliding contact when the bolt 6 chucked by the chuck means 60 is to be pushed out by the push block 73. If, however, the hardnesses of the two members are made high, the wear is drastically suppressed to raise no practical problem.

As has been described hereinbefore, according to the automatic part feed system of the present invention, the part chucked by the chuck means is pushed into the hole of the work by the push means. As a result, the interference between the electrode and the chuck means can be eliminated to eliminate the wear of the electrodes, which might otherwise be caused by the chuck means. Thus, the frequency for repairing or replacing the electrode can be drastically reduced, as compared with the system of the prior art, to enhance the working efficiency.

Since, moreover, the shape of the portion of the push means for pushing the part to be welded is held in the predetermined one for a long time, the part can be accurately inserted into the hole of the work.

Since, still moreover, the chuck means can be moved away from the electrode by the first transducer means and the second transfer means, it can be protected against the electrode pressure and the welding heat, which are caused at each welding operation, so that the its durability and reliability can be improved far better than those of the system of the prior art. As a result, the bolt can be prevented from any mistaken insertion to retain the stable welding quality.

What is claimed is:

1. An automatic feed system for a part to be welded, comprising:

feed means for feeding a part to be welded which can be inserted into a hole of a work, to the vicinity of an electrode of a welder;

chuck means for removably chucking the part fed by said feed means;

first transfer means for transferring the trailing end of said feed means to and from said chuck means;

a guide pin held capable of being transferred by said electrode for being inserted into said work when said work is to be positioned;

second transfer means connected to said chuck means for positioning the part, which is chucked by said chuck means, concentrically of the guide pin of said electrode; and push means transferred by said second transfer means for pushing the part, which is chucked concentrically of said guide pin by said chuck means, to insert said part into the hole of said work.

2. An automatic part feed system according to claim 1, wherein said feed means includes: a part feeder having a feed hose; and a feed pipe attached to the trailing end of said feed hose and connected to said first transfer means.

3. An automatic part feed system according to claim 1, wherein said chuck means includes fingers, a pair of pins, and a compression coil spring.

4. An automatic part feed system according to claim 1, wherein said first transfer means includes a feed pipe lever, an escape cylinder, an adjusting screw, a support member, a head block and a pin.

5. An automatic part feed system according to claim 1, wherein said second transfer means includes a head pipe, a head cylinder and an insertion base.

6. An automatic part feed system according to claim 1, wherein said push means includes a pin joint, an insertion cylinder, and guide means for guiding said part.

7. An automatic part feed system according to claim 6, wherein said guide means includes a push block, a guide pin and a pair of guide plates having guide holes.

* * * * *